(12) United States Patent
Cerreto

(10) Patent No.: US 9,046,061 B2
(45) Date of Patent: Jun. 2, 2015

(54) PURIFYING SYSTEM FOR COMBUSTIVE AIR

(75) Inventor: Nicola Cerreto, Reggio Emilia (IT)

(73) Assignee: EMAK S.P.A., Bagnolo In Piano (Reggio Emilia) (IT)

( * ) Notice: Subject to any disclaimer, the term of this patent is extended or adjusted under 35 U.S.C. 154(b) by 1107 days.

(21) Appl. No.: 13/044,707

(22) Filed: Mar. 10, 2011

(65) Prior Publication Data

US 2012/0210703 A1 Aug. 23, 2012

(30) Foreign Application Priority Data

Feb. 17, 2011 (EP) .................................... 11425034

(51) Int. Cl.
*F02M 35/022* (2006.01)
*B01D 45/12* (2006.01)
*F02M 35/08* (2006.01)
*F02M 35/10* (2006.01)

(52) U.S. Cl.
CPC ............. *F02M 35/022* (2013.01); *B01D 45/12* (2013.01); *F01N 2470/30* (2013.01); *F01N 2590/06* (2013.01); *F02M 35/08* (2013.01); *F02M 35/1017* (2013.01)

(58) Field of Classification Search
CPC ..... F01N 1/14; F01N 13/082; F01N 2470/24; F01N 2470/30; F01N 2270/00–2270/10; F02M 35/08; F02M 35/086

USPC .......................... 60/317, 319, 324; 210/512.2
See application file for complete search history.

(56) References Cited

U.S. PATENT DOCUMENTS

| | | | |
|---|---|---|---|
| 2,795,291 A | 6/1957 | Pierce | |
| 3,469,566 A | 9/1969 | Wilkinson et al. | |
| 4,178,760 A * | 12/1979 | Alf et al. ........................ | 60/319 |
| 4,249,922 A * | 2/1981 | Saele .............................. | 55/315 |
| 2008/0104936 A1 | 5/2008 | Kellermann | |

FOREIGN PATENT DOCUMENTS

| | | |
|---|---|---|
| DE | 202006002330 U1 | 6/2007 |
| EP | 0558091 A1 | 9/1993 |
| WO | 2009106591 A2 | 9/2009 |

* cited by examiner

*Primary Examiner* — Audrey K Bradley
*Assistant Examiner* — Jonathan Matthias
(74) *Attorney, Agent, or Firm* — Volpe and Koenig, P.C.

(57) ABSTRACT

A purifying system for combustive air in an internal combustion engine is provided. The system includes an intake conduit of combustive air into the engine, a discharge conduit of the exhaust gases produced by the engine, and a cyclone separator associated to the intake conduit and provided with a collecting tank of detritus, a link conduit which has a greater diameter than the discharge conduit and which is inserted on at least a terminal tract of the discharge conduit, such that a hollow space is defined between the terminal tract and the link conduit, and a connecting conduit destined to connect the collecting tank with the hollow space by flowing into the link conduit upstream of an end of the discharge conduit with respect to an outflow of the exhaust gases.

10 Claims, 4 Drawing Sheets

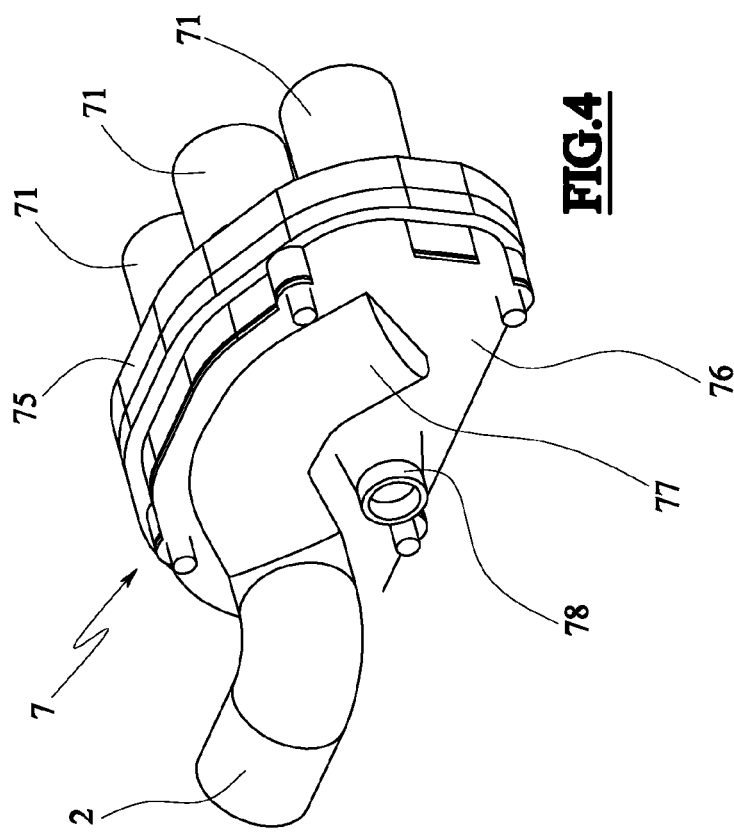
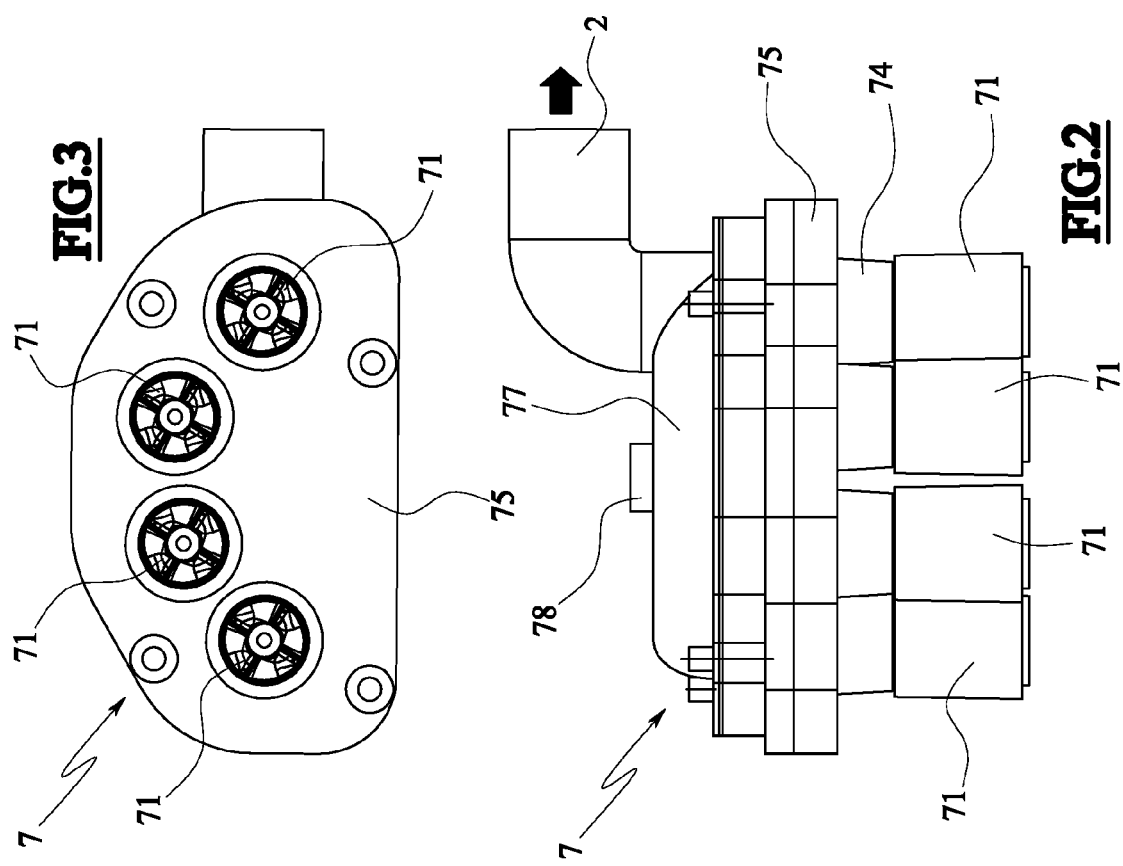

PURIFYING SYSTEM FOR COMBUSTIVE AIR

FIELD OF INVENTION

The invention relates to a purifying system of combustive air flowing into an aspiration conduit of small internal combustion engines. In particular the invention relates to a purifying system suitable for small two-stroke engines destined to work in difficult environments that are very polluted by dust and other undesirable materials.

A field of application of the invention is with tools such as choppers or masonry-cutting saws which are activated by small two-stroke engines and work in humid and dirty environments in the presence of detritus such as for example concrete powder, iron filings and water.

BACKGROUND

Classic purifying systems for this type of tool and engines comprise a cartridge filter inserted in the aspiration conduit of the motor.

However, when the air is very polluted, the filter rapidly blocks and normal engine functioning is compromised, or in any case perfect purification is not guaranteed.

To obviate this drawback purifying systems exist which comprise cyclone means destined to separate the heaviest polluting parts of the air, downstream of which the usual cartridge filter is located.

These known systems create the air flow to be filtered with the aid of the engine, which aspirates the environmental air and forces it to cross the cyclone, from the central/axial zone of which the purified air to be sent on exits, possibly with the interposing of a typical cartridge filter, to the aspiration conduit of the engine.

The known systems, though resolving the problem of purification of the aspirated air effectively, are afflicted by a series of drawbacks which limit the use thereof.

A first drawback is that the impurities separated by the cyclone and aspirated by the cooling fan actually foul the cooling fan and the surrounding parts of the engine.

A second drawback lies in the difficulty of properly adjusting the pressure internally of the cyclone, in order to be able to guarantee optimal aspiration of air through the cartridge filter.

In attempts to obviate these drawbacks, solutions have been proposed in which the cyclone is provided with a collecting tank for the detritus which separates from the air, from which a connecting conduit branches and opens into a narrow tract of the motor discharge conduit.

In use, this narrow tract of the discharge conduit behaves as a Venturi tube which creates a depression at the narrow section in which the connecting conduit opens, which thus enables the polluting material to be aspirated from the collecting tank.

In this way, the polluting material is discharged externally through the exhaust pipe, together with the exhaust gases, without fouling the motor or the tool associated thereto.

A system of this type is illustrated, for example, in European Patent No. EP0558091.

This type of purifying system is, however, also not free of drawbacks. In particular, the Venturi tube constitutes a choke in the discharge conduit, which obstructs the outflow of the exhaust gases, causing significant load loss.

To obviate this load loss, a significant part of the energy produced by the motor has to be expended in increasing the exhaust gas pressure, and cannot therefore be effectively exploited to work the tool to which the motor is associated, thus reducing its performance and increasing the overall consumption of fuel.

The presence of a choke on the discharge conduit further lowers the overall performance of the motor.

The choke modifies the discharge system which, as is known, is a determinant factor for obtaining good performance in two-stroke engines of simple construction, such as those used for this type of tool.

SUMMARY

The aim of the present invention is to obviate the above-cited problems with a simple, effective and relatively economical solution.

This aim is attained by a purifying system having the characteristics cited in the independent claim. The dependent claims recite further characteristics designed to improve the results of the invention.

In substance, in the invention the combustive air is collected from the outside via a usual conduit which flows tangentially internally of one or more cyclone devices arranged preferably in parallel.

The swirling motion internally of these devices, which develops prevalently tangentially, causes the densification of the heaviest polluting particles in the vicinity of the cyclone walls, while a cleaner air flow is generated about the axis of the cyclone.

This substantially-clean flow of air is directed to the intake conduit and is aspirated internally of the engine cylinder.

In cases of greater pollution, the purified air flow at the outlet of the cyclone can be made to pass through a usual filter located on the intake conduit downstream of the cyclone separator.

The air comprising the polluting particles is aspirated into a collection tank.

To this end the collecting tank is placed in communication with the engine discharge conduit via a link conduit having a greater diameter than the discharge conduit and which is inserted on at least a terminal tract of the discharge conduit, such that between the terminal tract and the link conduit a hollow space is defined, and via a connecting conduit that connects the collecting tank with the hollow space by joining the link conduit upstream of the end of the link conduit with respect to the outflow direction of the exhaust gases.

Thanks to this solution, the exhaust gases flowing out from the end of the discharge conduit transfer a part of their motion quantity to the air, initially at rest, which is in the link conduit. This air is thus accelerated and forced to flow towards the exhaust pipe, creating, in the hollow space between the link conduit and the terminal tract of the discharge conduit, a depression which creates a continuous air flow from the collecting tank of the cyclone separator towards the connecting conduit and from there, drawn by the exhaust gas as explained herein above, towards the exhaust pipe.

In this way, the polluting particles which end up in the collecting tank flow to the discharge without fouling parts of the engine or the tool, and without placing any choke on the discharge conduit, which freely opens into the larger link conduit, thus preventing loss loads which otherwise might negatively affect the discharge regime and the performance of the engine.

In a preferred aspect of the invention, the axis of the connecting conduit, at the inflow section into the connecting conduit, is inclined with respect to the axis of the terminal tract of the discharge conduit in a same direction as the outflow direction of the exhaust gases, i.e. in such a way that the direction of the air flow coming from the connecting conduit has a same-direction component as the outflow direction of the exhaust gases.

This particular has the advantage of facilitating the discharge of the detritus and the other impurities coming from the collecting tank of the cyclone separator.

Alternatively, the axis of the connecting conduit, at the inflow section into the connecting conduit, might be perpendicular to the axis of the terminal tract of the discharge conduit.

The disclosure further provides a work tool, for example a chopper or a wall saw, which comprises an internal combustion engine and a purifying system of the above-described type.

BRIEF DESCRIPTION OF THE DRAWINGS

The advantages and constructional and functional characteristics of the invention will emerge from the detailed description that follows, aided by the drawings of the accompanying tables which illustrated a preferred embodiment thereof, provided by way of non-limiting example, in which:

FIG. 2 is a lateral view from II of a component of the invention;

FIG. 3 is a plan view of FIG. 2, without the cover;

FIG. 4 is a perspective view of the detail illustrated in FIG. 2;

DETAILED DESCRIPTION OF THE PREFERRED EMBODIMENTS

Figure 1:
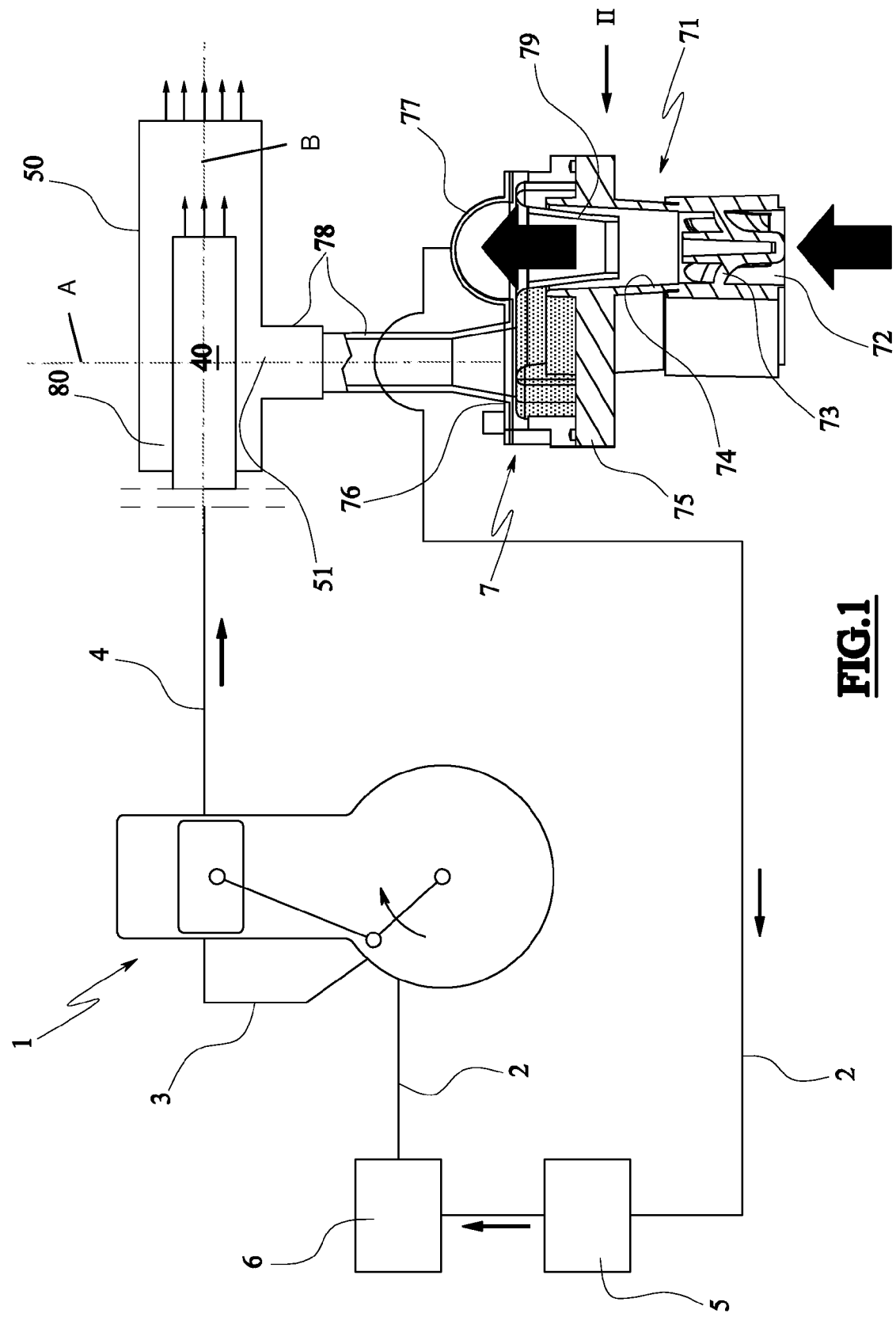
FIG. 1 is a schematic view of the layout of the invention.

FIG. 1 schematically illustrates a two-stroke engine 1 which exhibits the usual intake conduit 2, displacement conduit 3 and exhaust conduit 4.

In series on the intake conduit 2 there are a cyclone separator device 7, a usual cartridge filter 5 and a usual carburettor 6.

The cyclone separator device 7 comprises, in the example, four cyclones 71, each in turn comprising a conduit for aspirating polluted air from the environment through the lower opening 72.

Helical static elements 73 are located in the opening, which elements 73 impart a helical motion on the entering air which, as it develops prevalently in a tangential direction, causes a thickening of the heavier polluting particles in the vicinity of the cyclone 71 walls, while it generates a cleaner flow of air about the axis thereof.

For each cyclone 71, a cylindrical tract 74 or preferably a slightly flared tract is located axially to the static elements 73, which tract 74 terminates internally of an upper collection tank 75 closed by a cover 76.

The cover 76 comprises a manifold 77 having a semicircular section and communicating with the intake conduit 2, as well as a single connecting conduit 78 flowing into a connecting conduit 50 with the discharge conduit 4 upstream of a usual exhaust pipe.

The terminal tract of the tracts 74 comprises a truncoconical conduit 79 flared towards the cover which directly communicates with the overlying manifold 77.

Between the truncoconical conduit 79 and the tract 74 a space is created which directly communicates with the inside of the tank 75 and thereafter with the connecting conduit 78.

In this way, the polluting particles which collect thickly on the walls of the cyclone 71 flow into the collecting tank 75, while the cleaner air flow generated about the axis of the cyclones 71 is directed to the intake conduit 2, is subjected to a filtering stage in the cartridge filter 5 and is finally aspirated into the engine 1 cylinder.

Figure 5:
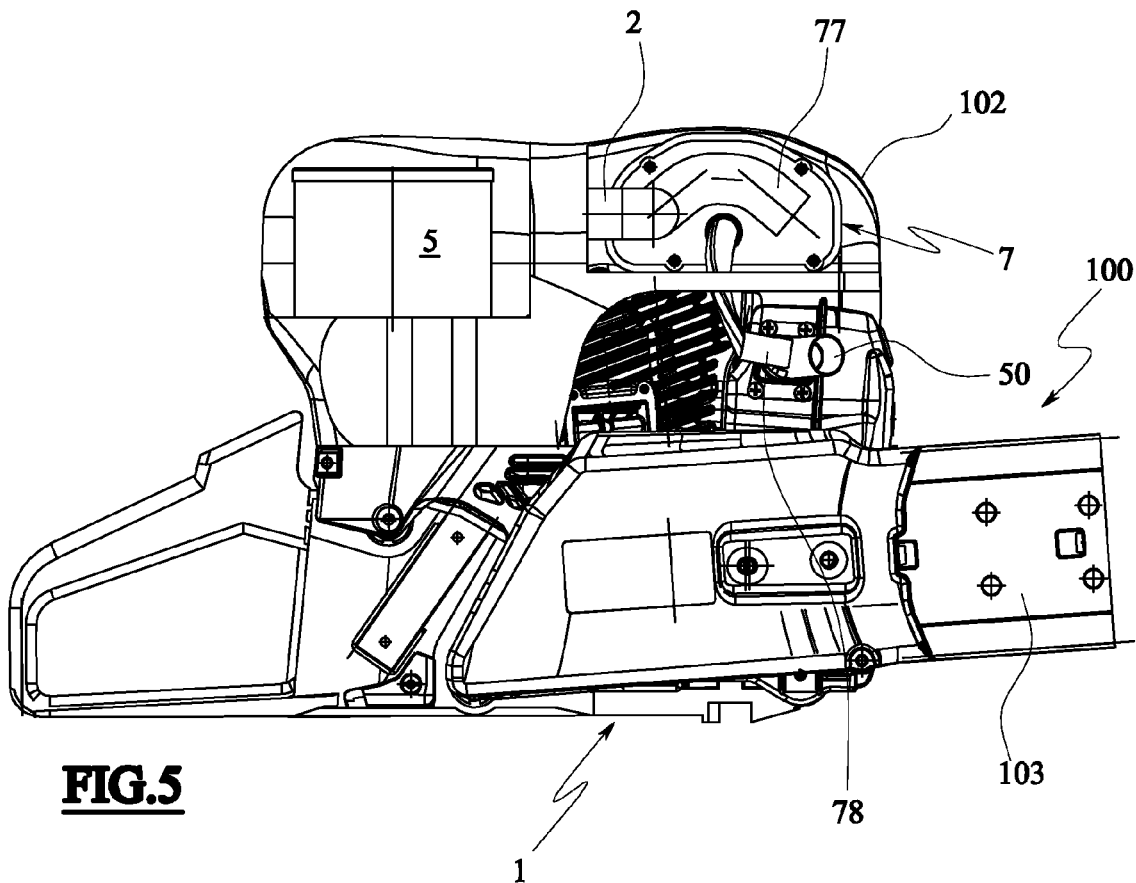
FIGS. 5 and 6 respectively show a lateral view and a plan view of a mechanical chain-saw (chopper) comprising the invention.
Figure 6:
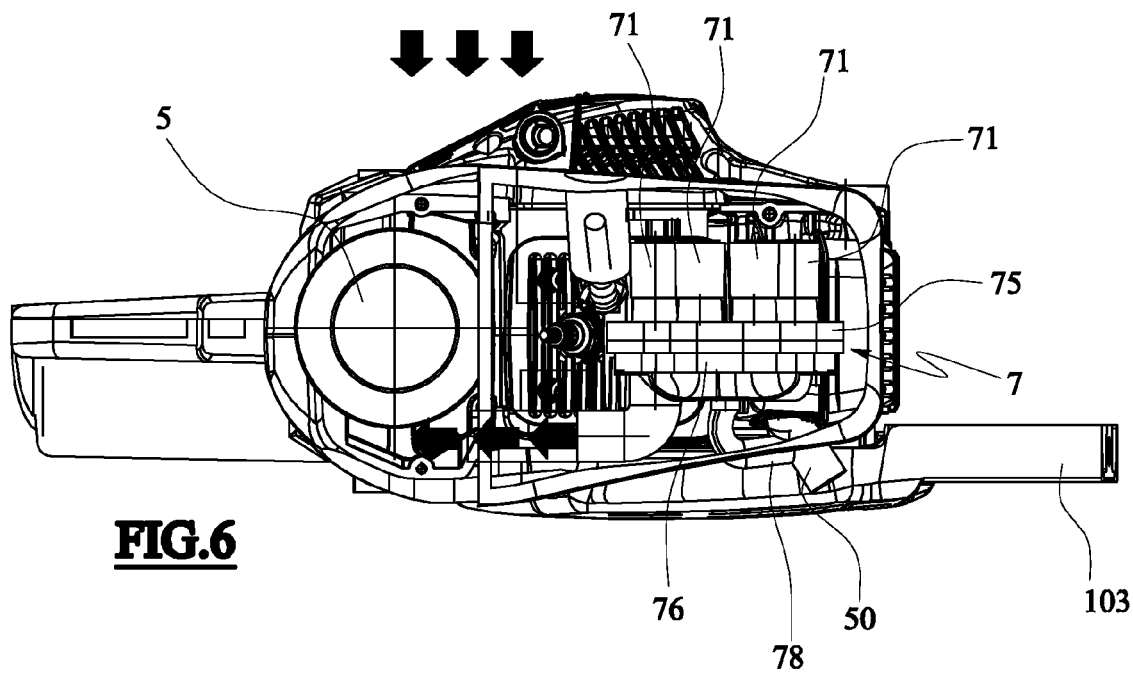

FIGS. 5 and 6 illustrate a chopper 100 activated by the engine 1, masked by the upper protection 102.

The cartridge air filter 5, as well as the cyclone separator device 7, are housed in the protection 102; the cyclone separator device 7 comprises four horizontal-axis cyclones 71, the axes of which are perpendicular to the vertical plane of a transmission chain 103.

Figure 8:
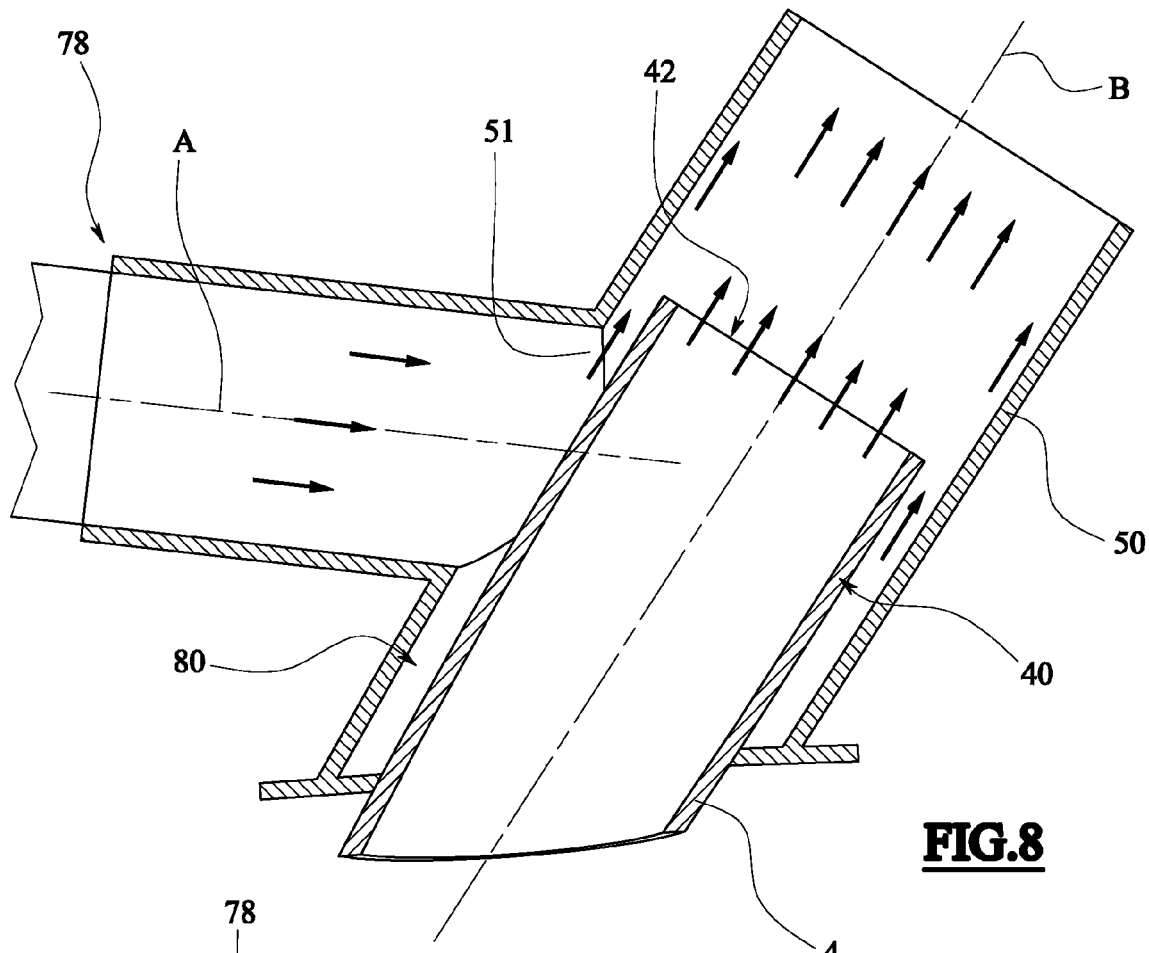
FIG. 8 is an enlargement of section VIII-VIII of FIG. 7.
Figure 7:
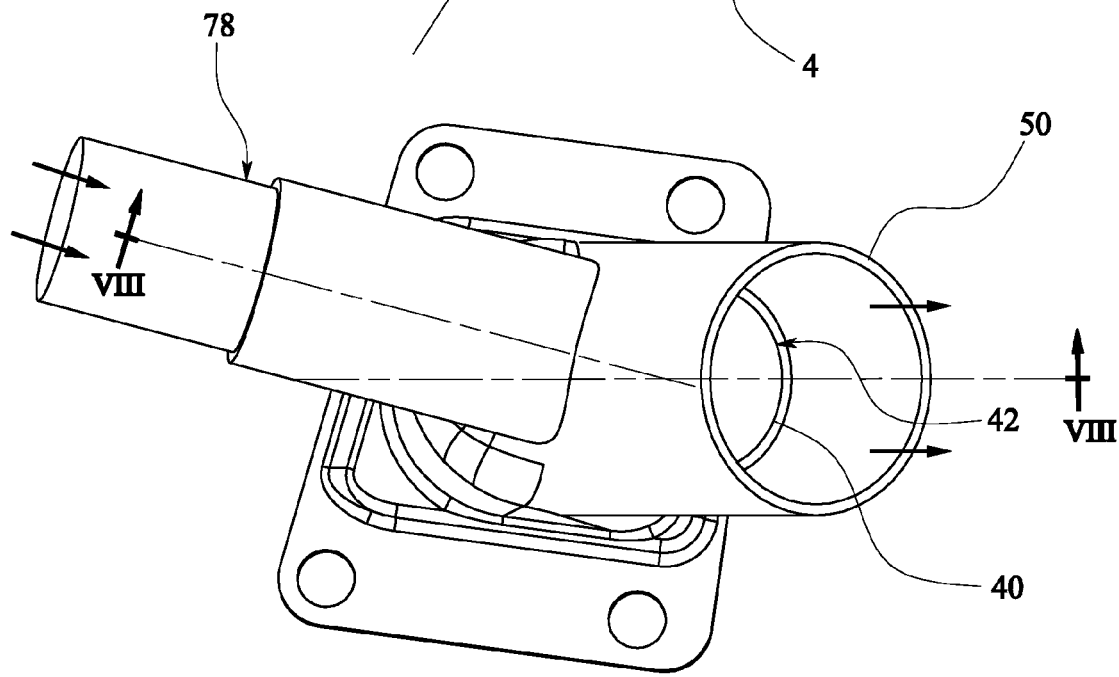
FIG. 7 is an enlarged detail of FIG. 5.

As illustrated in FIGS. 7 and 8, the connecting conduit 50 has a greater diameter than the discharge conduit 4 and is inserted coaxially on the terminal tract 40 thereof, such that between the terminal tract 40 and the connecting conduit 50 an annular space 80 is defined, which is closed at the end facing towards the engine 1 while it is open at the end facing outside.

The connecting conduit 78 flows into the hollow space 80 via a mouth 51, which is afforded in the lateral wall of the connecting conduit 50 and is located upstream of the end section 42 of the discharge conduit 4 with respect to the outflow direction of the exhaust gases.

At the join section into the connecting conduit 50, the longitudinal axis A of the connecting conduit 78, i.e. of the mouth 51, is inclined with respect to the longitudinal axis B of the terminal tract 40 of the discharge conduit 4.

This inclination is in the same direction as that of the exhaust gas outflow direction, i.e. is such that the direction of an air flow coming from the connecting conduit 78 has a component which is the same as the outflow direction of the exhaust gas. Alternatively, the longitudinal axes A and B might be perpendicular to one another.

The system functions as follows. The exhaust gases flowing from the end section 42 of the discharge conduit 4 transfer part of their quantity of motion to the air, initially at rest, which is in the connecting conduit 50.

This air is accordingly accelerated and forced to flow towards the exhaust pipe 40 and the outside, creating, in the hollow space 80, a depression which aspirates a part of the clean air that has crossed the cyclone or the group of cyclones from the connecting conduit 78.

This flow of air carries with it the polluting material that accumulated by the cyclones 71 in the collecting tank 75, which mixes with the exhaust gases that then transport it to the outside via the exhaust pipe, without fouling the engine or the tool associated thereto.

As a result of the above-described entraining effect of the exhaust gases, the depression in the hollow space 80 and the relative aspirating effect continue up until when the engine 1 is switched off.

The system is not limited by the above-described example; any variants or improvements made thereto are encompassed by the following claims.

Though the description relates to an application with a small two-stroke engine, the system is also applicable, for example, to a four-stroke engine.

The type of tool associated with the engine is not critical to the application of the system.

What is claimed is:

1. A purifying system for combustive air in an internal combustion engine (1), the system comprising an intake conduit (2) of combustive air into the engine (1), a discharge conduit (4) of the exhaust gases produced by the engine (1), and a cyclone separator (7) associated with the intake conduit (2) and provided with a detritus collecting tank (75), a cylindrical link conduit (50), which has a greater diameter than the discharge conduit (4) and which is inserted on at least a terminal tract (40) of the discharge conduit (4), such that a hollow space (80), of toroidal section, is defined between the terminal tract (40) and the link conduit (50), and a connecting conduit (78) configured to connect the collecting tank (75) with the hollow space (80) by flowing into the link conduit (50) upstream of an end (42) of the discharge conduit (4) with respect to an outflow of the exhaust gases, wherein the terminal tract (40) of the discharge conduit (4) is cylindrical along the entire length of the link conduit (50).

2. The system of claim 1, wherein the link conduit (50) is coaxially inserted on the terminal tract (40) of the discharge conduit (4).

3. The system of claim 1, wherein an axis (A) of the connecting conduit (78), at the joining section into the link conduit (50), is inclined with respect to an axis (B) of the terminal tract (40) of the discharge conduit (4), in a same direction as the outflow of the discharge gases.

4. The system of claim 1, wherein an axis (A) of the connecting conduit (78), at the joining section with the link conduit (50), is perpendicular to an axis (B) of the terminal tract (40) of the discharge conduit (4).

5. The system of claim 1, wherein the cyclone separator (7) comprises at least one cyclone device (71), which comprises an intake conduit for aspirating polluted air through an opening (72) in which helical static elements (73) are located in order to impart a swirling motion on intake air.

6. The system of claim 5, wherein for each cyclone device (71), a cylindrical or slightly flared tract (74) is located axially to the static elements (73), the tract (74) terminating internally of the upper tank (75), the upper tank (75) being closed by a cover (76).

7. The system of claim 6, wherein the cover (76) comprises, for each cyclone device (71), a truncoconical conduit (79) which is flared towards the cover, the truncoconical conduit (79) coaxially inserts in a terminal part of the tract (74) and with the tract (74) the truncoconical conduit (79) creates a space which communicates directly with an inside of the collecting tank (75).

8. The system of claim 7, wherein the cover (76) comprises a manifold (77) communicating with the intake conduit (2) and located such as to overlie ends of the truncoconical conduits (79) of the cyclone devices (71), as well as communicating with the connecting conduit (78).

9. The system of claim 1, further comprising a filter (5) associated with the intake conduit (2) downstream of the cyclone separator (7) with respect to an aspirating direction of the combustive air.

10. A tool (100) comprising an internal combustion engine (1) and a purifying system as in claim 1.

* * * * *